Patented Mar. 3, 1953

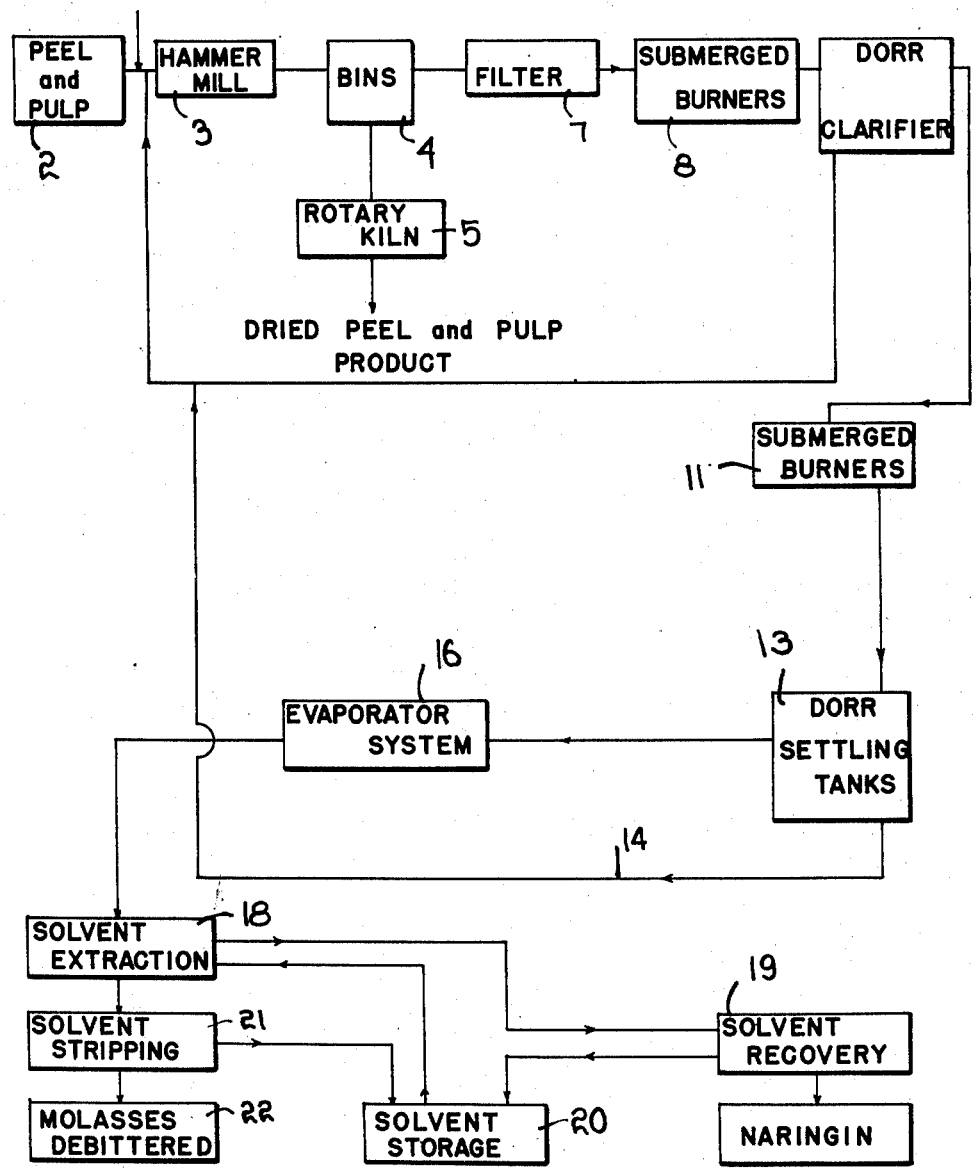

2,630,432

UNITED STATES PATENT OFFICE 2,630,432

PROCESS FOR THE ISOLATION OF FLAVANONE GLUCOSIDES

Everette M. Burdick, Weslaco, and Robert H. Maurer, Pharr, Tex., assignors to Texsun Citrus Exchange, Weslaco, Tex., a corporation Application January 24, 1949, Serial No. 72,288

10 Claims. (Cl. 260—210)

1

The invention relates to an improvement over our co-pending application, Serial No. 20,816, now Patent No. 2,510,797 for an invention in "Removal of Naringin from Citrus," filed April 13, 1948, and to an improvement in co-pending applications, Serial Numbers 20,814, now Patent No. 2,525,645, and 20,815, now Patent No. 2,525,645, for inventions in "Method of Processing Citrus Peel and Citrus Peel Liquor" and "Method of Processing Citrus Juices," filed in the names of Everette M. Burdick and James S. Allen.

An object of the instant invention is to provide a method of removing the glucosides hesperidin and naringin from citrous liquor and citrous juice.

Another object of the invention is to provide a method for manufacturing debittered molasses from citrous juices.

Another object of the invention is to provide a method of solvent extraction of liquors containing flavanone glucosides to remove the flavanone glucosides naringin, hesperidin, eriodictin, sakuranin, liquiritin, citronin, and neohesperidin therefrom.

Still another object of the invention is to provide a method for recovering flavanone glucosides from citrous liquors in quantities sufficient for commercial use.

Still a further object of the invention is to solvent-extract citrous liquors to recover naringin and other flavanone glucosides therefrom and to thereafter separate the naringin and other flavanone glucosides from such solvent.

A still further object of the invention is to provide a method for treating citrous peel and citrous peel liquors whereby a useful feed product may be obtained from the citrous peel and a debittered molasses produced from the citrous peel liquors.

Other objects and advantages of the invention will become more readily apparent from a consideration of the following description and the enclosed drawing, which illustrates a flow diagram of the preferred procedure.

It has been proposed in the past to extract flavanone glucosides from citrous solutions by using ethanol. However, it has been found that while it is relatively easy to produce the glucosides by such a method, the cost involved prohibits the use of such method on a commercial scale.

It has also been proposed to recover flavanone glucosides from citrous products by relying upon the increased solubility of such glucosides in water at elevated temperatures. Although this method is very simple, it has many limitations

2 in that large heating and extracting equipment must be used and large volumes of liquid must be cooled and held for extensive periods, during which time fermentation is apt to destroy any sugar present and otherwise interfere with the crystallization of the glucoside from the solution. More recent improvements have been made on the latter procedure by proper adjustment of the pH of the solution and coagulation of the pectin by alkaline earth compounds, in which case the glucoside is made more soluble and extracted without much heat. The glucoside is then obtained by crystallization after separation of the liquid and the pulp and adjustment of the pH between 2.5 and 6.

The instant invention differs from the foregoing procedure in that the first method proposed with ethanol involved the use of ethanol applied directly on the citrous peel whereas the solvent extraction of flavanone glucosides in the instant invention is carried out on aqueous extract previously obtained from the peel, leaves, etc., or on the fruit juices, which contain the glucosides. This difference is advantageous in that the source of material being extracted is much richer in the glucosides and the volumes handled are naturally smaller for the same amounts of glucoside isolated.

The instant invention differs from the second proposed practice mentioned above in that we use no heat in the extraction of the peel but do prefer a warm solution during the solvent extraction of the concentrated liquors.

The instant invention also differs from the improvements devised for the second procedure in that our procedure allows the extraction of the glucosides from concentrated solutions, whereas in the old improved procedure, which includes the adjustment of pH and coagulation of pectins, the glucosides must still be crystallized from a dilute solution.

For example, it is well known that grapefruit contains on an average one per cent of the flavanone glucoside naringin, which represents the maximum concentration obtainable in an extract without concentration. We have found that it is almost impossible to crystallize the glucoside naringin from water extracts of grapefruit peel. However, by concentrating the water extract our process permits easy recovery therefrom of the glucoside naringin.

The advantages of the instant invention are, therefore, apparent from a commercial point of view in that a smaller amount of solvent can be used and increased yields are obtainable with the instant procedure upon crystallization and the over-all equipment in the procedure is greatly reduced as compared to that heretofore used in view of the fact that small volumes of extract are handled per unit weight of naringin or other glucoside obtained therefrom.

We have found that two general types of solvents may be used in practicing the invention. For example, we have found that when a concentrated aqueous solution containing the flavanone glucosides is intimately mixed with an immiscible solvent and then allowed to separate into two layers or phases, most of the glucoside will be found in the immiscible solvent layer. This is based upon the principle that a chemical will distribute itself between two immiscible solvents according to its solubility in those solvents. Generally speaking, any type solvent may be used which is immiscible with the aqueous solution of glucosides on the one hand and in which the glucosides are preferentially soluble as compared to the aqueous solution, but which will not dissolve the sugars, proteins, and pectins to any marked extent from the aqueous solution.

We have found that solvents such as butyl alcohol, isoamyl alcohol, hexyl alcohol, cyclohexanol, ethyl acetate, amyl acetate, and ethyl ether, which are of the type that are immiscible with water but in which the flavanone glucosides are preferentially soluble as compared to their solubility in water, serve quite well as solvents in practicing the invention.

As previously mentioned, we prefer than an aqueous solution containing the flavanone glucosides be warmed during the solvent extraction, and we have found that a temperature range from 20° C. to 60° C. is the optimum temperature range in which the solvent extraction may be carried out. For example, the following experiments conducted on the flavanone glucoside naringin at a temperature of 60° C. will illustrate this point:

1. An aqueous solution was made by dissolving 8 grams of naringin in enough water to make 100 milliliters of solution. This solution was thoroughly shaken with 100 grams of butyl alcohol and then allowed to separate. The butyl alcohol, being less dense than water, rose to the top and upon analysis was found to contain about 7 grams of naringin, or about 87.5% of that dissolved in the water. Only 1 gram, or 12.5%, remained in the water phase.

2. An 8% aqueous solution of naringin was made as in Example 1, and after adjusting the temperature to 60° C. it was thoroughly mixed with an equal weight of isoamyl alcohol at the same temperature. After separation of the two phases, the isoamyl alcohol was found to contain 27.3% of the naringin originally present in the water, while the aqeous phase contained 72.7% of the naringin.

An alternate type of solvent may be used to extract the flavanone glucosides from the aqueous glucoside-containing solution. For example, we have found that when concentrates containing the flavanone glucosides are treated with solvents like acetone, methyl alcohol, ethyl alcohol, and propyl alcohols, which are miscible with the aqueous glucoside-containing solution, two layers are formed with most of the flavanone glucosides in the solvent-rich layer.

Generally speaking, any type of solvent may be used which is miscible with the aqueous glucoside solution on the one hand but in which solvent the flavanone glucosides are preferentially soluble as compared to the original solution, and which solution will not dissolve sugars, proteins, and pectins to any marked extent from the original solution. While any suitable solvent having these properties may be used, we have found acetone works quite well as a solvent, since it dissolves less sugar, protein, pectin, and other materials from the mother liquor than do the other solvents of this class solvent. This is advantageous in that it enables one to recover the glucosides in a purer form, and fewer crystallizations are needed to obtain satisfactory yields of the glucosides from the solvent; for example:

*Extraction of the flavanone glucoside naringin from grapefruit molasses with ethyl alcohol.*

100 grams of grapefruit molasses containing 8.3 grams of naringin were mixed in a high-speed blender with 100 grams of 95% ethyl alcohol and allowed to settle or separate into two layers. The alcohol layer was found to contain 5.12 grams of naringin, or 61.6% of the total naringin. An additional treatment with ethyl alcohol removed still more naringin.

*Extraction of naringin from grapefruit molasses with acetone*

250 grams of grapefruit molasses containing 20.8 grams of naringin was extracted with 500 grams of acetone. The extract layer was found to contain 13.5 grams, or 65% of the total naringin. When the raffinate was treated with another 500-gram portion of acetone, 7.1 grams, or 34.2% more naringin was extracted. Both extractions by this batch method then gave 99.2% extraction of the naringin present in the molasses.

While it is believed that the preferred method of practicing the invention to recover the flavanone glucosides is apparent, it will be assumed that the bitter flavanone glucoside naringin is to be extracted from citrus peels and pulp remaining after the citrus fruit has been dejuiced, as described in the co-pending application of Everette M. Burdick and James S. Allen, Serial No. 20,814, for "Method of Processing Citrus Peel and Citrus Peel Liquor," filed on April 13, 1948.

Such peels and pulp remaining after the citrus fruit has been dejuiced is passed to a storage bin 2 to await processing. From the storage bin such solid wastes are conveyed to a hammer mill or other suitable type pulverizer as denoted at 3 to break the wastes into relatively small particles. Prior to treatment in the pulverizer, a quantity of lime may be added to the waste; the amount of lime added may vary, depending upon several conditions. However, it is advantageous to add enough lime to at least neutralize all acid forming substances present, and there may be an excess of lime present without affecting the final product after treatment.

The lime added coagulates the pectin present in the pulp and peel and releases a watery solution therefrom. The watery solution or effluent may be removed from the solid waste in any suitable manner, and to this end there is provided a plurality of bins 4, which are provided with openings therein through which the peel liquor or watery effluent may drain. The time required for the reaction between the lime and peels may be varied; however, most desirable results are obtained when the peels are allowed to remain in the bins from two to four hours.

The liquor waste or effluent drained from the bins is passed through any suitable filtering means, such as screen 7, to remove any large solid particles therefrom. After such time the pulverized pulp and peel remaining in the bins may be moved to a dryer 5, which removes the water content thereof and produces a final product substantially granular in form. This product may be pulverized to any suitable size. Any suitable dryer may be used, and it has been found that a rotary kiln serves the purpose quite well, due to the fact that the materials having a gelatinous nature in the pulp and peel are removed by the treatment in the bins prior to the drying step. The elimination of these materials having gelatinous nature eliminates sticking of the pulp and peel on the hot surfaces of the dryer.

The liquid is then subjected to a heat treatment in a submerged combustion chamber 8. This chamber may be of any suitable configuration, and it has been found that a vertically arranged cone-shape tank serves the purpose quite well. A conduit is positioned in the tank and is provided with a combustion chamber thereon. Air or oxygen and a suitable fuel, such as natural gas or the like, are injected into the conduit and combustion thereof effected in the combustion chamber.

It is to be pointed out that the combustion chamber is immersed in the peel liquor solution substantially below the surface level thereof, so that the products of combustion, mostly composed of carbon dioxide gas, are evolved into the solution and create turbulence therein and become intimately intermingled therewith.

The temperature within the submerged combustion unit 8 may be varied, depending upon various conditions. However, it has been found that best results are obtained when the peel liquor is maintained at a temperature of from 175 to 190° F. for a period of from 20 to 30 minutes. This temperature and time of operation are desirable because the calcium citrate comprises approximately 75% of the precipitate which is formed within the combustion unit, and it is believed that calcium citrate forms more readily at temperatures above 180° F.

Submerged combustion equipment is well known, and has been utilized in several different fields of application. It is not, therefore, believed necessary to give a detailed description thereof, since any submerged burner equipment could be practiced with the invention.

In addition to calcium citrate, calcium pectinate also forms a precipitate, and a certain amount of protein material is coagulated by the heat and separates from the solutions. Colloidal material suspended in the peel liquor solution that might tend to form scale when subjected to heat is also trapped by the other scale-forming materials and is precipitated in the combustion unit 4.

Formation of a precipitate that will settle or filter with ease requires that the peel liquor solution be held for at least ten minutes at approximately 190° F. Somewhat shorter times are necessary at higher temperatures, while longer times are necessary at lower temperatures. However, a period of twenty to thirty minutes at a temperature of 175 to 190° F. is very satisfactory for large scale operation. Longer treating periods are not harmful, and even have a certain advantage in that a higher degree of concentration is obtained. The combustion unit 11 not only serves to remove scale-forming compounds from the peel liquor solution, but the solution will also be concentrated by the evaporation of water therefrom. The carbon dioxide evolved in the combustion unit will combine with any excess lime to form calcium carbonate, which will precipitate along with the other scale-forming compounds. Due to the turbulence of the peel liquors within the submerged combustion unit, the precipitate will continue to remain carried by the solution and will not form scale on the surfaces of the submerged combustion unit.

The submerged combustion unit may be operated either in a batch process or in a continuous process, and a suitable quantity of raw peel liquor can be injected to the combustion chamber in order to maintain a satisfactory liquid level therein while at the same time draining that portion of the peel liquor from the submerged unit which has been treated for a sufficient length of time. The peel liquor containing the precipitate of suspended solids, calcium citrate, calcium pectinate, and calcium carbonate, and other protein material which may have formed a precipitate, is then subjected to a clarification treatment by any suitable method, such as filtering, centrifuging, settling, or the like. It has been found that a Dorr thickener serves the purpose quite satisfactorily, and any suitable size may be used, depending upon the capacity of the plant. The precipitate, above mentioned, which is separated from the solution, can be reinjected into the system at any suitable point, and is shown as being introduced at 10 along with the lime, which is preferably before the pulp and peels are pulverized. The peel liquor effluent removed from the Dorr thickener is then subjected to a second heating in a submerged combustion chamber 11. This second treatment serves to remove any residual traces of scale-forming compounds which might be contained in the peel liquor solution. The solution removed from the submerged burner 11, which has a precipitate dispersed therein, is passed to a second settling unit 13, which separates the precipitate from the solution. The precipitate may be injected through the line 14 to the point 10 back into the system.

The clear peel liquor effluent is removed from the second settling tank and subjected to heating in evaporator system 16, which concentrates the peel liquor to the desired consistency.

While the invention has been described wherein two submerged combustion units are utilized, the invention will work when only one combustion unit is used; however, it has been found that a more efficient separation of the scale-forming materials from the solution is obtained when at least two submerged burners are used.

Citrus juices may also be treated in substantially the foregoing manner in order to remove the pectins and scale-forming substances from the juice prior to its concentration. A particular method of processing the citrus juices is described in co-pending application, No. 28,815, of Everette M. Burdick and James S. Allen for an invention in Method of Processing Citrus Juices, filed on April 13, 1948.

The concentration of the peel liquor or citrus juices may be anywhere from 50° Brix to 80°, depending upon the exact physical properties of the concentrated material and upon which type solvent is to be used to recover the naringin. The 50° Brix concentrates are very thin and easily handled during the extraction with immiscible-type solvent, such as butyl alcohol, but they require a larger amount of solvent for complete extraction. The more concentrated peel liquors or citrus juices tend to form emulsions that are not readily separated into two layers; however, less solvent is needed for complete extraction of the naringin. It, therefore, seems obvious that the concentration of the peel liquor or citrus juice may be varied without necessarily departing from the scope of the invention; but if the solvent used is of the type which is immiscible with the concentrated peel liquor or fruit juices, then we have found that a concentration of 60° Brix allows a satisfactory separation of the naringin therefrom.

Of course, the amount of solvent used will depend somewhat upon the concentration of the peel liquor or citrus juice being treated; however, we have found that about two volumes of solvent of either type disclosed per one volume of concentrated flavanone glucoside solution works quite well with the invention. A range of from one to four volumes of either type solvent per one volume of concentrate may be used, if desired.

The immiscible-type solvent, such as butanol, is thoroughly mixed, as illustrated at 18, with the naringin-containing solution and then allowed to settle or separate. The flavanone glucosides being preferentially soluble in the butanol, will pass from the mother liquor phase into the butanol phase or layer. Since the extraction of the flavanone glucoside naringin is illustrated in the example, the naringin will pass from the concentrated solution into the butanol phase.

The butanol and glucoside (in this case, naringin) may then be separated in any suitable manner, as denoted at 19 in the drawing; however, it must be kept in mind that the separation must take place at temperatures below 80° C., at which temperature the naringin tends to decompose. One suitable method of separating the butanol from the naringin is to subject the mixture of butanol and naringin to a vacuum distillation to maintain the temperature thereof below the critical 80° point. Water is added to the solvent and the distillation continued to remove all traces of butanol, finally ending with a solution containing about 40–50% solids, which is allowed to cool and crystallize. The crystals present are naringin, which are filtered and washed with cold water, since naringin is very insoluble in cold water. The naringin crystals may then be dried at 100 or 110° C. to produce the stable dihydrate form of naringin.

The solvent extracted from the naringin may be returned to the storage tank 20, from whence it may be reinjected into the liquor concentrate at 18 in order to extract the naringin therefrom. Any solvent remaining in the concentrated peel liquor or citrous juices may be removed by any suitable solvent-stripping means, as illustrated at 21, whereupon a debittered molasses product is had at 22.

If a type solvent is used which is miscible with the aqueous concentrated glucoside solution, such as acetone, two layers are produced, with the solvent layer being rich in the glucoside and the remaining concentrated aqueous solution containing mainly peel liquor or concentrated citrus juice molasses, as the case may be. The acetone may be distilled from the glucoside naringin, and water may be added if necessary to separate the naringin from the acetone since all of the acetone must be recovered or separated from the glucoside to effect crystallization thereof. It has been found that very few impurities are present in the glucoside (in the example, naringin) formed from solvents such as acetone, since it shows a high degree of selectivity from the glucosides. The crystalline naringin separated from the water may be filtered and dried, as previously explained in the butanol process.

The acetone separated from the glucoside may be returned to the solvent storage tank 20, from which it may be reinjected into the flavanone glucoside-containing solution at 18 to effect separation of the glucosides from such solution.

While a particular method has been described for the preparation of a liquor solution containing the flavanone glucoside naringin in order that such solution could be treated in accordance with the instant invention to isolate such naringin, it is to be understood that any suitable method may be used for treating and concentrating flavanone glucoside-containing solutions in order to prepare them for treatment in accordance with the instant invention without necessarily departing from the scope thereof.

Additionally, while the invention has been described as applying particularly in the extraction of naringin from grapefruit, such description is for exemplary purposes only, and any aqueous flavanone glucoside-containing solutions, from any source, may be used in practicing the invention.

Broadly, the invention contemplates a method for processing flavanone glucoside-containing solutions to recover the glucosides from such solutions.

What is claimed is:

1. A method of obtaining the bitter glucoside naringin from citrus wastes comprising treating a citrus pulp and peel waste with an alkaline reagent to coagulate the undesirable pectin in said waste to form a precipitate thereof and a supernatant liquid effluent containing naringin, separating said supernatant liquid effluent from said precipitate concentrating said effluent to a predetermined concentration, and mixing with said supernatant liquid effluent which has been concentrated to a predetermined concentration a non-aqueous organic solvent in which naringin is soluble but sugars, proteins and pectins are not soluble to any marked extent to form a solvent-naringin phase and a mother liquor phase.

2. A method of obtaining the bitter glucoside naringin from citrus wastes comprising treating a citrus pulp and peel waste with an alkaline reagent to coagulate the undesirable pectin in said waste to form a precipitate thereof and a supernatant liquid effluent containing naringin, separating said supernatant liquid effluent from said precipitate, concentrating said effluent to a predetermined concentration, mixing with said concentrated supernatant liquid effluent a non-aqueous solvent to form a solvent-naringin phase and a mother liquor phase, separating said phases, and thereafter distilling said solvent naringin phase at a temperature below 80° C. to separate said naringin therefrom.

3. A process of preparing molasses from aqueous citrus effluent by removing the bitter glucoside naringin therefrom, comprising the steps of, adding an alkaline reagent to coagulate undesirable matter therein and leaving an effluent portion, heating said effluent portion with an open flame submerged therein to precipitate undesired matter and concentrating said effluent portion to a range of 50° Brix to 80° Brix, adding a liquid non-aqueous organic solvent to the concentrated effluent in the amount of one to four volumes of solvent per one volume of concentrated effluent to separate the naringin therefrom, and thereafter separating the naringin from the solvent.

4. A method of obtaining the bitter glucoside naringin from citrus wastes comprising treating a citrus pulp and peel waste solution with an alkaline reagent to coagulate the undesirable pectin in said waste to form a precipitate thereof and a supernatant liquid effluent containing naringin, separating said supernatant liquid effluent from said precipitate, and mixing with said supernatant liquid effluent a non-aqueous organic solvent selected from the group consisting of butyl alcohol, isoamyl alcohol, hexyl alcohol, cyclohexanol, ethyl acetate, amyl acetate, and ethyl ether, to form a solvent naringin phase and a mother liquor phase.

5. A method of obtaining the bitter glucoside naringin from citrus wastes comprising treating a citrus pulp and peel waste with an alkaline reagent to coagulate the undesirable pectin in said waste to form a precipitate thereof and a supernatant liquid effluent containing naringin, separating said supernatant liquid effluent from said precipitate and mixing butyl alcohol with said supernatant liquid effluent to form a butyl alcohol naringin phase and a mother liquor phase.

6. A method of obtaining the bitter glucoside naringin from citrus wastes comprising treating a citrus pulp and peel waste with an alkaline reagent to coagulate the undesirable pectin in said waste to form a precipitate thereof and a supernatant liquid effluent containing naringin, separating said supernatant liquid effluent from said precipitate and mixing with said supernatant liquid effluent a non-aqueous water-immiscible organic solvent to form a solvent-naringin phase and a mother liquor phase.

7. A method of obtaining a flavanone glucoside from citrus wastes comprising treating a citrus pulp and peel waste with an alkaline reagent to coagulate the undesirable pectin in said waste to form a precipitate thereof and a supernatant liquid effluent containing a flavanone glucoside, separating said supernatant liquid effluent from said precipitate concentrating said supernatant liquid to a predetermined concentration, and mixing with said concentrated supernatant liquid effluent a non-aqueous organic solvent to form solvent-glucoside phase and a mother liquor phase.

8. A method of obtaining the bitter glucoside naringin from citrus wastes comprising treating a citrus pulp and peel waste with an alkaline reagent to coagulate the undesirable pectin in said waste to form a precipitate thereof and a supernatant liquid effluent containing naringin, separating said supernatant liquid effluent from said precipitate, concentrating said liquid effluent to a predetermined concentration by heating said effluent with an open flame submerged therein to form a syrup, then mixing acetone with said syrup with the resultant formation of an acetone-naringin phase and a mother liquor phase, separating said acetone-naringin phase and said mother liquor phase, and thereafter treating said acetone-naringin phase to free said naringin in a purified form from said acetone.

9. A method of isolating and purifying naringin from citrus wastes, comprising treating a citrus pulp and peel waste with an alkaline reagent to coagulate the undesirable pectin in said waste to form a precipitate thereof and a supernatant liquid effluent containing naringin, separating said supernatant liquid effluent from said precipitate, concentrating said liquid effluent to a predetermined concentration, then mixing acetone with said concentrated liquid effluent to form an acetone-naringin phase and a mother liquor phase, separating said phases, and thereafter treating said acetone-naringin phase to separate the naringin therefrom.

10. A method of obtaining a flavanone glucoside from citrus wastes comprising treating a citrus pulp and peel waste with an alkaline reagent to coagulate the undesirable pectin in said waste to form a precipitate thereof and a supernatant liquid effluent containing a flavanone glucoside, separating said supernatant liquid effluent from said precipitate, and mixing with said supernatant liquid effluent a non-aqueous organic solvent to form a solvent-glucoside phase and a mother liquor phase.

EVERETTE M. BURDICK.
ROBERT H. MAURER.

REFERENCES CITED

The following references are of record in the file of this patent:

UNITED STATES PATENTS

| Number | Name | Date |
|---|---|---|
| 2,152,827 | Szent-Gzorgi | Apr. 4, 1939 |
| 2,359,126 | Lautenschlager et al. | Sept. 26, 1944 |
| 2,421,062 | Higby | May 27, 1947 |
| 2,421,063 | Baier | May 27, 1947 |

OTHER REFERENCES

Poore, Ind. Eng. Chem., v. 26 (1934), pp. 637–9.
Millard, "Physical Chem. for Colleges," 6th ed., 1946, pp. 189–190.